(12) United States Patent
Agirman et al.

(10) Patent No.: US 10,221,038 B2
(45) Date of Patent: Mar. 5, 2019

(54) CONTROL STRATEGIES FOR MULTILEVEL LINE REGENERATIVE DRIVE

(71) Applicant: OTIS ELEVATOR COMPANY, Farmington, CT (US)

(72) Inventors: Ismail Agirman, Southington, CT (US); Yang Wang, Manchester, CT (US); Shashank Krishnamurthy, Rocky Hill, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 187 days.

(21) Appl. No.: 15/103,170

(22) PCT Filed: Dec. 18, 2013

(86) PCT No.: PCT/US2013/076172
§ 371 (c)(1),
(2) Date: Jun. 9, 2016

(87) PCT Pub. No.: WO2015/094232
PCT Pub. Date: Jun. 25, 2015

(65) Prior Publication Data
US 2016/0311645 A1    Oct. 27, 2016

(51) Int. Cl.
*B66B 1/30* (2006.01)
*H02P 27/08* (2006.01)
(Continued)

(52) U.S. Cl.
CPC ............ *B66B 1/308* (2013.01); *H02M 5/4585* (2013.01); *H02M 7/487* (2013.01); *H02P 27/08* (2013.01); *H02P 29/50* (2016.02); *H02P 29/68* (2016.02)

(58) Field of Classification Search
CPC .... H02M 7/487; H02M 7/483; H02M 5/4585; H02M 3/158; H02M 7/5395; H02P 27/08;
(Continued)

(56) References Cited

U.S. PATENT DOCUMENTS

| 5,321,599 A | 6/1994 | Tanamachi et al. |
| 6,381,158 B1 | 4/2002 | Harbourt et al. |

(Continued)

FOREIGN PATENT DOCUMENTS

| CN | 1308785 A | 8/2001 |
| CN | 102882413 A | 1/2013 |

(Continued)

OTHER PUBLICATIONS

International Search Report and Written Opinion for applicaiton PCT/US2013/076172; dated Sep. 17, 2014, 13 pages.
(Continued)

*Primary Examiner* — Thai Dinh
(74) *Attorney, Agent, or Firm* — Cantor Colburn LLP

(57) ABSTRACT

A control system (48) having a motor (28) is disclosed. The control system (48) may include a converter (32) operatively connected to a power source (36), an inverter (34) operatively connected to the motor (28), and a controller (50) operatively connected to the converter (32) or inverter (34). The controller (50) may be configured to receive control command signals, receive state feedback signals, and generate duty cycle signals for upper and lower arms of each phase (40) of the motor (28) based at least in part on the control command signals and state feedback signals. The duty cycle signals may minimize neutral point current in the converter (32) or inverter (34).

16 Claims, 11 Drawing Sheets

(51) Int. Cl.
*H02M 5/458* (2006.01)
*H02M 7/487* (2007.01)
*H02P 29/50* (2016.01)
*H02P 29/68* (2016.01)

(58) Field of Classification Search
CPC .......... H02P 27/06; H02P 27/04; H02P 29/50; H02P 29/68; H02P 6/085; B66B 1/308
See application file for complete search history.

(56) References Cited

U.S. PATENT DOCUMENTS

| | | | |
|---|---|---|---|
| 7,061,134 B2* | 6/2006 | Hiti ................. | H02M 7/5387 290/44 |
| 7,679,941 B2 | 3/2010 | Raju et al. | |
| 8,120,306 B2* | 2/2012 | Chakrabarti ...... | H02M 7/53875 318/606 |
| 8,786,232 B2* | 7/2014 | Chai ................ | H02M 7/487 318/430 |
| 8,829,839 B1* | 9/2014 | Vrankovic ......... | H02K 11/0094 318/471 |
| 2010/0044160 A1* | 2/2010 | Agirman ........... | B66B 1/302 187/290 |
| 2011/0141786 A1* | 6/2011 | Shen ................. | H02M 7/487 363/131 |
| 2013/0169204 A1* | 7/2013 | Kuboe .............. | H02M 5/458 318/400.3 |
| 2013/0176757 A1* | 7/2013 | Morati .............. | H02M 7/537 363/71 |
| 2015/0035466 A1* | 2/2015 | MacLennan ....... | H01F 27/2823 318/494 |

FOREIGN PATENT DOCUMENTS

| | | |
|---|---|---|
| CN | 103138595 A | 6/2013 |
| JP | H09285136 A | 10/1997 |

OTHER PUBLICATIONS

Ui-Min Choi et al. 'Neutral-Point Voltage Balancing Method for Three-Level Inverter Systems with a Time-OFFset Estimation Scheme.' In: Journal of Power Electronics, vol. 13, No. 2, Mar. 2013, pp. 243-249.

Chinese First Office Action and Search Report for application CN 201380081741.0, dated Mar. 30, 2018, 14 pages.

Chinese Second Office Action for application CN 201380081741.0, dated Nov. 9, 2018, 16 pages.

* cited by examiner

Current distortion due to dead-time effects

Current with dead-time compensation

DNPC (left) and T-type (right) $\Delta T_{ic}$ with state-of-the-art NP-balancing PWM Current waveform and device j-c temperature rise with proposed thermal & NP-balancing PWM

CONTROL STRATEGIES FOR MULTILEVEL LINE REGENERATIVE DRIVE

FIELD OF THE DISCLOSURE

The present disclosure relates generally to elevator systems and, more particularly, to a control system and method for an elevator system.

BACKGROUND OF THE DISCLOSURE

Elevator systems typically include an elevator car positioned in a hoistway for carrying passengers and loads between various floors of a building. Elevator systems also include motors, which provide the requisite thrust force to move the elevator cars within the hoistways. Regenerative drives may be used to achieve desired elevator car movement and to generate electricity.

Regenerative drives may typically include a converter on the input or power utility grid side and an inverter on the motor side. In the design of a regenerative drive, power demand of the inverter is matched by an appropriate power capability of the converter. Power demands for operating elevators range from positive to negative. With positive power demands, externally generated power, such as power from a power utility grid, is used. With negative power demands, the load in the elevator drives the motor so it produces electricity as a generator. Use of the motor to produce electricity as a generator is commonly called regeneration. Regenerative drives may operate on a three-phase power input.

In addition, regenerative drives may be multilevel with a multilevel converter and a multilevel inverter. For example, a three-level regenerative drive may have a three-level converter and a three-level inverter. However, there are some issues in using a three-level converter and a three-level inverter. One issue is neutral-point voltage balancing, and another challenge is thermal management in the devices.

Accordingly, there exists a need for a control system that achieves both neutral-point voltage balancing and device thermal balancing simultaneously.

SUMMARY OF THE DISCLOSURE

According to one embodiment, a control system having a motor is disclosed. The control system may comprise a converter operatively connected to a power source, the converter having a plurality of devices in selective communication with each phase of the power source; an inverter operatively connected to a motor, the inverter having a plurality of devices in selective communication with each phase of the motor; and a controller operatively connected to the converter or inverter. The controller may be configured to receive control command signals, receive state feedback signals, and generate duty cycle signals for upper and lower arms of each phase of the motor based at least in part on the control command signals and state feedback signals. The duty cycle signals may minimize neutral point current in the converter or inverter.

In another embodiment, the duty cycle signals may relieve thermal stress across the plurality of devices.

In another embodiment, the controller may be further configured to generate duty cycle injection signals based at least in part on the state feedback signals.

In another embodiment, the controller may be further configured to generate a three-phase duty cycle signal based at least in part on the control command signals.

In another embodiment, the controller may be further configured to generate a duty cycle reference signal using the three-phase duty cycle signal.

In another embodiment, the controller may be further configured to determine the duty cycle signals for the upper and lower arms of each phase using the following formula:

$$D^*_i = D^*_{abc} + 0.5[\max(D^*_{abc}) + \min(D^*_{abc})]$$
$$D^*_{abc+} = 0.5(D^*_i - \min(D^*_i)) + D^*_{off1} + D^*_{off2} \quad \text{for upper arm}$$
$$D^*_{abc-} = |0.5(D^*_i - \max(D^*_i))| - D^*_{off1} + D^*_{off2} \quad \text{for lower arm}$$

where $D^*_i$ is the duty cycle reference signal, $D^*_{abc}$ is the three-phase duty cycle signal, $D^*_{abc+}$ is the duty cycle signal for the upper arm, $D^*_{abc-}$ is the duty cycle signal for the lower arm, and $D^*_{off1}$ and $D^*_{off2}$ are the duty cycle injection signals.

In another embodiment, the controller may be further configured to determine the duty cycle signals for the upper and lower arms of each phase using the following formula:

$$D^*_i = D^*_{abc} + 0.5[\max(D^*_{abc}) + \min(D^*_{abc})]$$
$$D^*_{abc+} = D^*_{i+} + D^*_{off1} + D^*_{off2} \quad \text{for upper arm}$$
$$D^*_{abc-} = D^*_{i-} - D^*_{off1} + D^*_{off2} \quad \text{for lower arm}$$

where $D^*_i$ is the duty cycle reference signal, $D^*_{abc}$ is the three-phase duty cycle signal, $D^*_{abc+}$ is the duty cycle signal for the upper arm, $D^*_{abc-}$ is the duty cycle signal for the lower arm, $D^*_{off1}$ is the duty cycle injection signal from the DC voltage difference PI regulator, $D^*_{off2}$ is the duty cycle injection signal from the harmonic calculator, $D^*_{i+}$ is the positive side of the duty cycle corresponding to the i (=a, b, or c) phase, and $D^*_{i-}$ is the negative side of the duty cycle corresponding to the i (=a, b, or c) phase.

In another embodiment, the controller may be further configured to determine dead-time compensation for each phase using the following formula:

$$\Delta D^*_{comp} = -\text{sign}(i) \times T_{DT} \times F_s$$

where $\Delta D^*_{comp}$ is the dead-time compensation, i is phase current direction, $T_{DT}$ is dead-time duration, and $F_s$ is pulse width modulation frequency.

In another embodiment, the converter or inverter may have a diode-neutral-point-clamped topology or a T-type topology.

In another embodiment, the control system may be applied to an elevator system.

According to another embodiment, a method for controlling a converter or an inverter is disclosed. The method may comprise receiving state feedback signals and control command signals, generating duty cycle injection signals based at least in part on the state feedback signals, generating a three-phase duty cycle signal based at least in part on the control command signals, and generating duty cycle signals for upper and lower arms of each phase of the motor which simultaneously balance neutral point voltage and thermal stress in the converter or inverter. The duty cycle signals may be based at least in part on the duty cycle injection signals and the three-phase duty cycle signal.

In another embodiment, the method may further comprise determining dead-time compensation for each phase based at least in part on phase current direction, dead-time duration, and pulse width modulation frequency.

In another embodiment, the method may further comprise modifying the duty cycle signals to incorporate the dead-time compensation.

In another embodiment, the method may further comprise the converter or inverter having a diode-neutral-point-clamped topology or a T-type topology.

In another embodiment, the method may further comprise determining values of the duty cycle injection signals based at least in part on the state feedback signals and a voltage difference between upper and lower DC buses of the converter or inverter.

According to yet another embodiment an elevator system is disclosed. The elevator system may comprise an elevator car disposed in a hoistway and a motor operatively connected to the elevator car. The motor may generate a thrust force to move the elevator car within the hoistway. The elevator system may further comprise a power source operatively connected to the motor, the power source supplying power to the motor; a converter operatively connected to the power source, the converter having a plurality of devices in selective communication with each phase of the power source; and an inverter operatively connected to the motor, the inverter having a plurality of devices in selective communication with each phase of the motor, and a controller in communication with the converter or inverter. The controller may be configured to receive control command signals, receive state feedback signals, and generate duty cycle signals for upper and lower arms of each phase of the motor that simultaneously balance neutral point voltage and thermal stress in the converter or inverter. The duty cycle signals may be based at least in part on the control command signals and the state feedback signals.

In another embodiment, the controller may be further configured to determine dead-time compensation for each phase of the motor, and modify the duty cycle signals to include the dead-time compensation.

In another embodiment, the converter or inverter may have a diode-neutral-point-clamped topology or a T-type topology.

In another embodiment, the controller may be further configured to have a harmonic calculator, the harmonic calculator generating a duty cycle injection signal that balances neutral point voltage of the converter or inverter.

In another embodiment, the controller may be further configured to have a voltage difference regulator, the voltage difference regulator generating a duty cycle injection signal that balances thermal stress across the plurality of devices in the converter or inverter.

While the present disclosure is susceptible to various modifications and alternative constructions, certain illustrative embodiments thereof, will be shown and described below in detail. It should be understood, however, that there is no intention to be limited to the specific embodiments disclosed, and the intention is to cover all modifications, alternative constructions, and equivalents along within the spirit and scope of the present disclosure.

DETAILED DESCRIPTION

Figure 1:
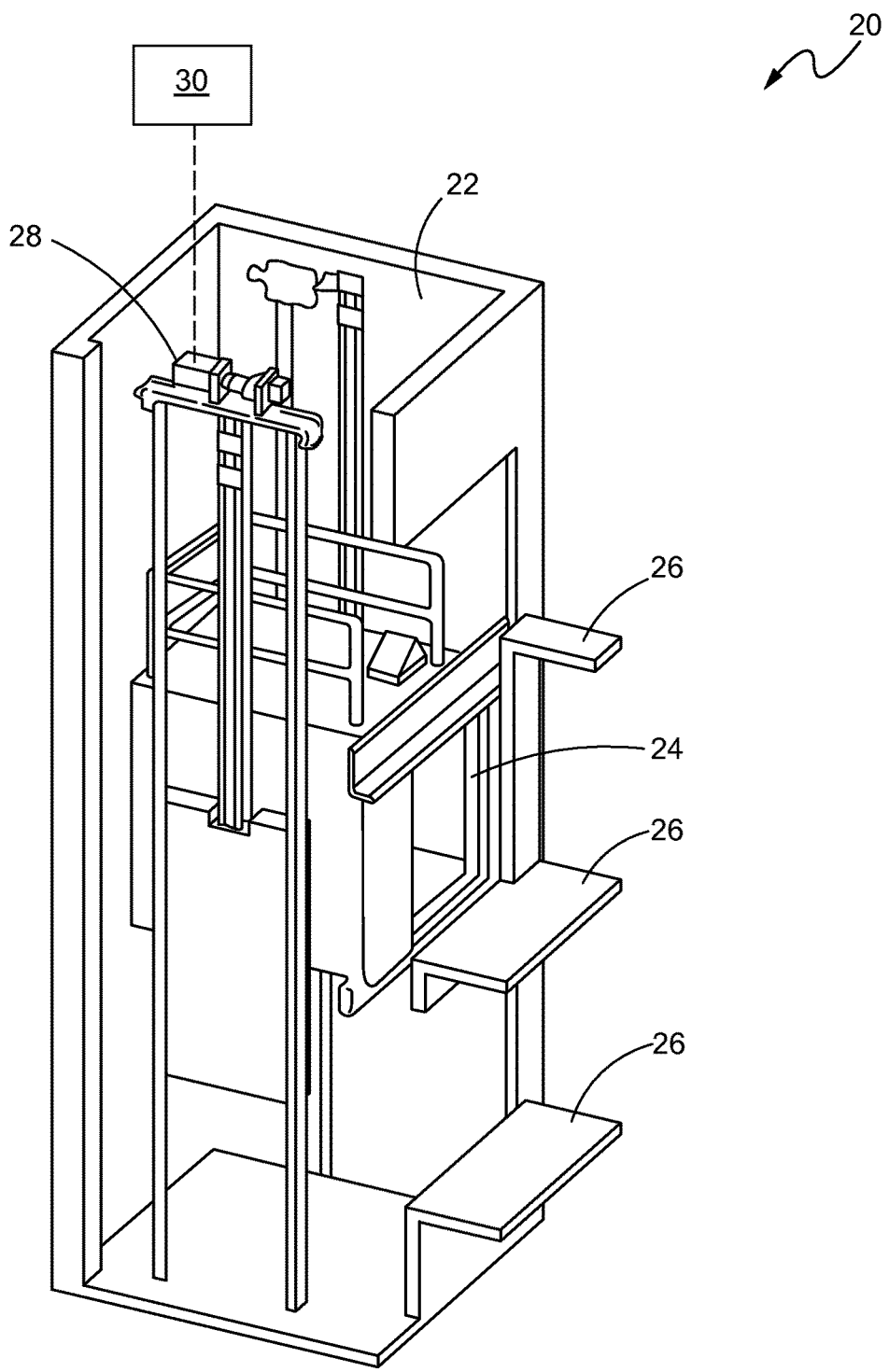
FIG. 1 is a schematic representation of an elevator system, according to one embodiment of the present disclosure.

Referring now to the drawings, and with specific reference to FIG. 1, a schematic diagram of an elevator system 20 is provided, according to an exemplary embodiment. It is to be understood that the version of the elevator system 20 shown in FIG. 1 is for illustrative purposes only and to assist in disclosing various embodiments of the invention. As is understood by a person skilled in the art, FIG. 1 does not depict all of the components of an exemplary elevator system, nor are the depicted features necessarily included in all elevator systems.

As shown in FIG. 1, the elevator system 20 may reside fully or partially in a hoistway 22 that is vertically disposed within a building. The hoistway 22 may provide a vertical path through which an elevator car 24 may travel between floors or landings 26 of the building. A motor 28, or other prime mover, may be operatively connected to the elevator car 24 in order to generate a thrust force to move the elevator car 24 within the hoistway 22. The motor 28 may also be referred to as a machine, or in alternate configurations, the motor 28 may be a part of a machine that is used to move an elevator car 24.

Figure 2:
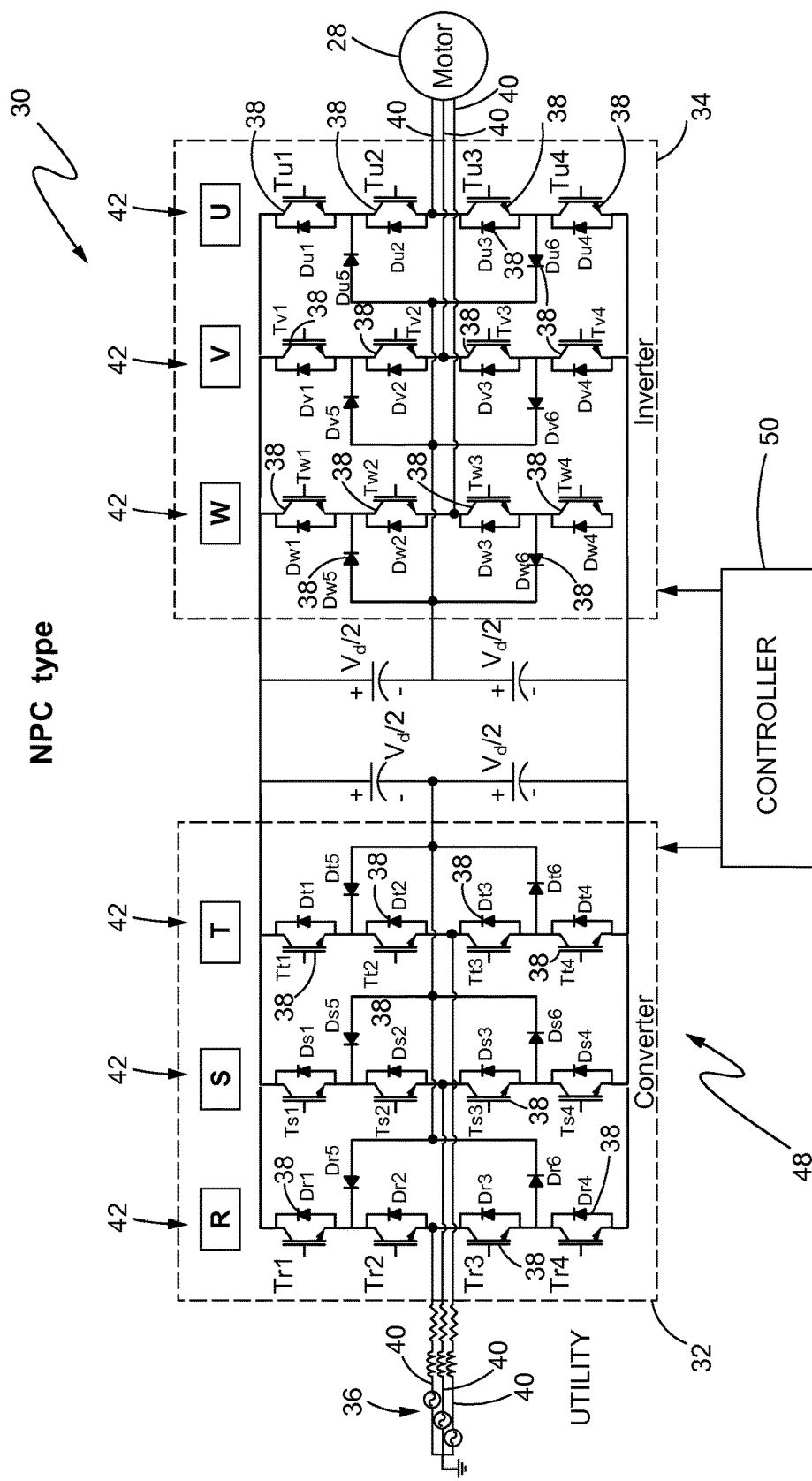
FIG. 2 is a schematic representation of a diode-neutral-point-clamped (DNPC) regenerative drive for the elevator system of FIG. 1 according to an exemplary embodiment of the invention.

A power source 36 (as shown in FIG. 2) may be operatively connected to the motor 28 in order to supply power to the motor 28. The power source 36 may be externally generated power, such as from a power utility grid. The motor 28 and power source 36 may each be three-phase. In addition, a regenerative drive 30 may be coupled to the motor 28 and power source 36 in order to operate the motor 28 to achieve the desired elevator car movement.

Referring now to FIGS. 2-5, with continued reference to FIG. 1, the regenerative drive 30 may include a converter 32 on the input or power utility grid side and an inverter 34 on the motor side. More specifically, the converter 32 may be operatively connected to the power source 36 and may have a phase-leg 42 for each phase 40 of the power source 36. The inverter 34 may be operatively connected to the converter 32 and motor 28 and may have a phase-leg 42 for each phase 40 of the motor 28. In this example, since the power source 36 and motor 28 are each three phase, the converter 32 and the inverter 34 may each have three phase-legs 42.

Furthermore, each phase-leg R, S, T of the converter 32 may have a plurality of devices 38 in selective communication with each phase 40 of the power source 36, and each phase-leg W, V, U of the inverter 34 may have a plurality of devices 38 in selective communication with each phase 40 of the motor 28. The regenerative drive 30 may be a multilevel drive having a multilevel converter 32 and a multilevel inverter 34. In this example, the regenerative drive 30 may be a three-level drive with a three-level converter 32 and a three-level inverter 34. More specifically, each phase-leg 42 of the converter 32 and inverter 34 may output three levels of voltage, e.g., a positive voltage, a neutral point voltage, and a negative voltage.

Figure 3:
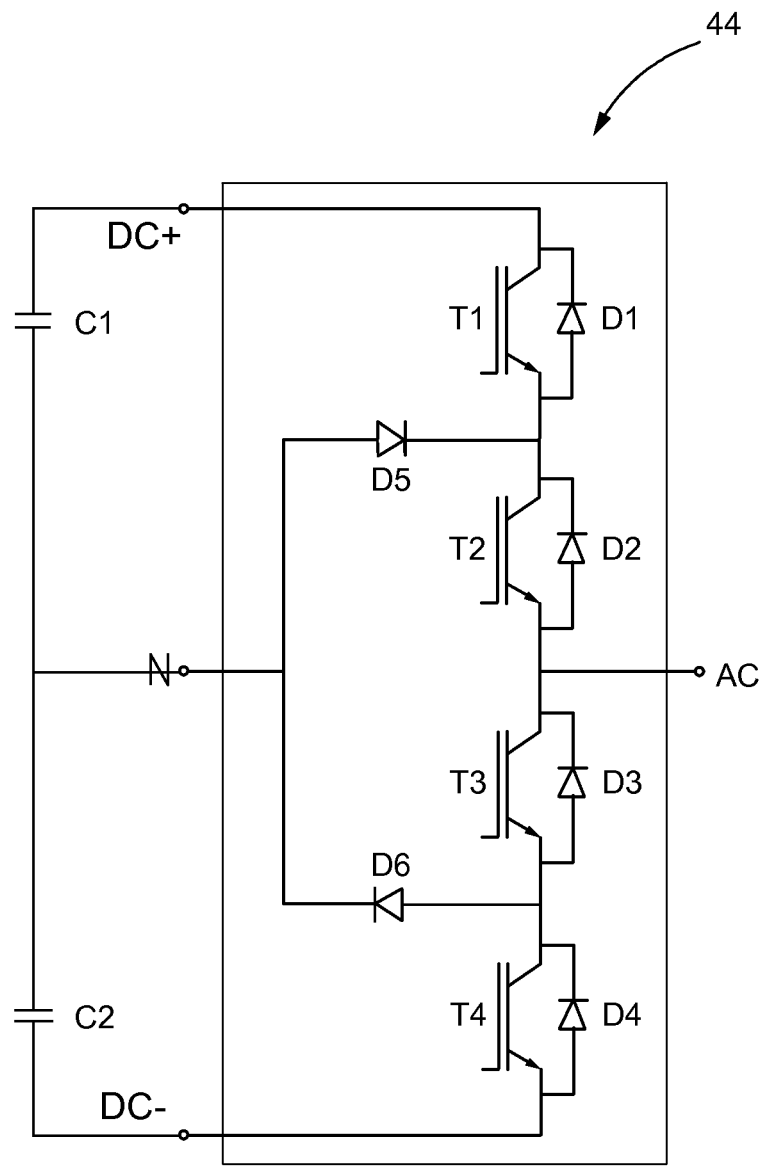
FIG. 3 is a schematic representation of a phase leg of a converter or an inverter of the regenerative drive of FIG. 2 according to an exemplary embodiment of the invention.
Figure 4:
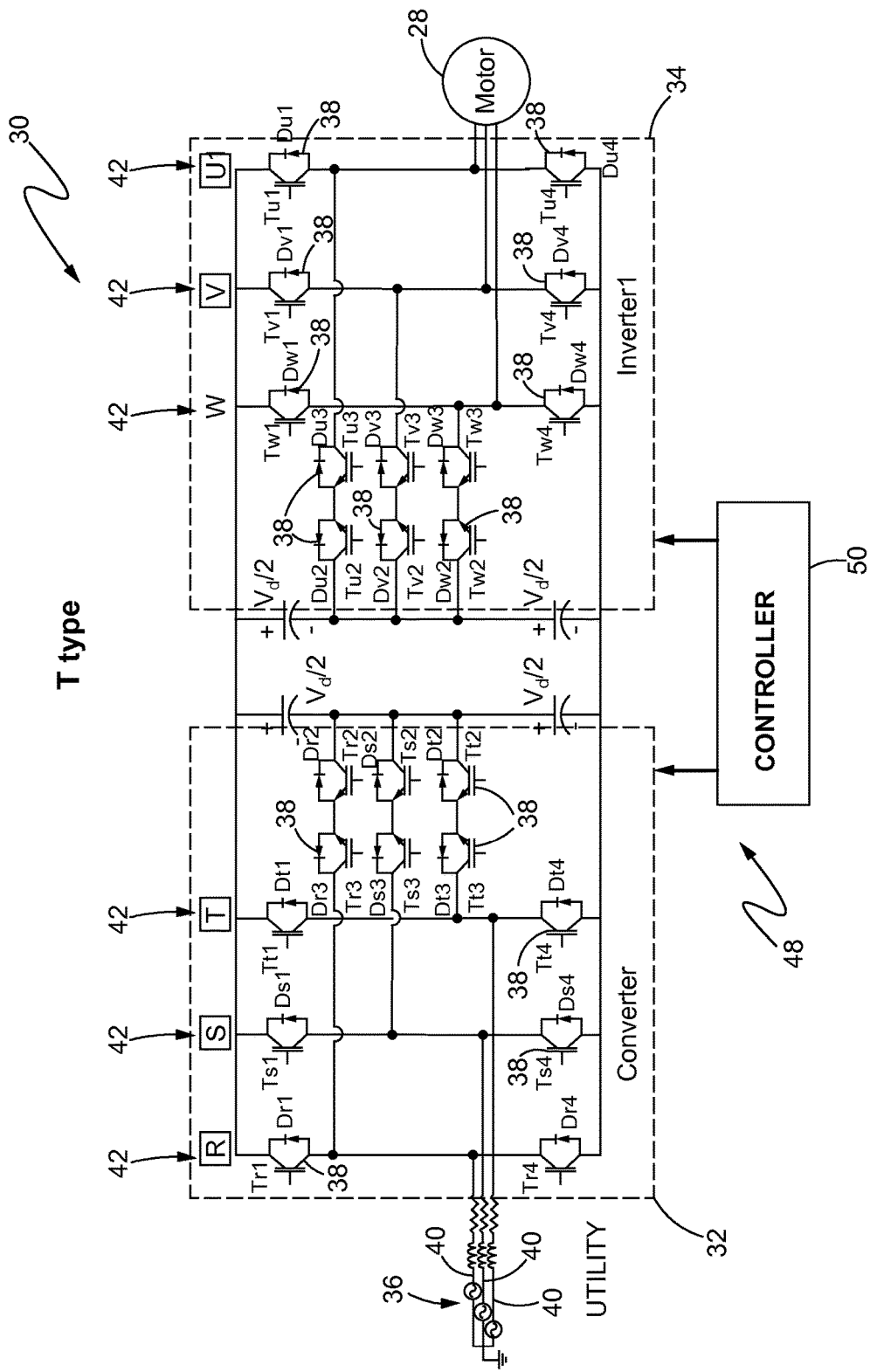
FIG. 4 is a schematic representation of a T-type regenerative drive for the elevator system of FIG. 1 according to an exemplary embodiment of the invention.
Figure 5:
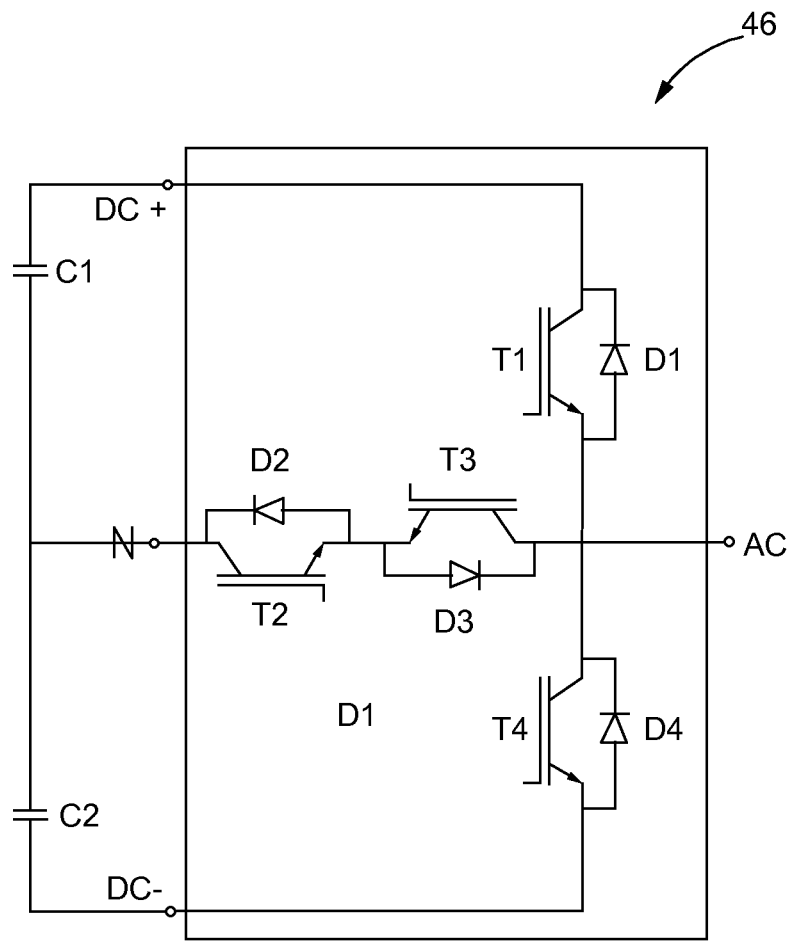
FIG. 5 is a schematic representation of a phase leg of a converter or an inverter of the regenerative drive of FIG. 4 according to an exemplary embodiment of the invention.

As shown best in FIGS. 2 and 3, each phase-leg 42 of the converter 32 and inverter 34 may have a diode-neutral-point-clamped (DNPC) topology 44. In an embodiment shown in FIGS. 4 and 5, each level or phase-leg 42 of the converter 32 and inverter 34 may have a T-type topology 46. It is to be understood that other topologies for the phase-leg 42 of the converter 32 and inverter 34 are certainly possible.

A control system 48 may be used to control the regenerative drive 30. More specifically, a controller 50 may be operatively connected to and used to control the converter 32 and inverter 34. Although the controller 50 is shown and described as applying to both the converter 32 and the inverter 34, it is to be understood that there may be two separate controllers instead of one controller, e.g., one controller for the converter 32 and one controller for the inverter 34. The controller 50 may comprise a processor (e.g., "computer processor") or processor-based device that may include or be associated with a non-transitory computer readable storage medium having stored thereon computer-executable instructions. It is understood that the control system 48 and controller 50 may include other hardware, software, firmware, or combinations thereof.

Figure 6:
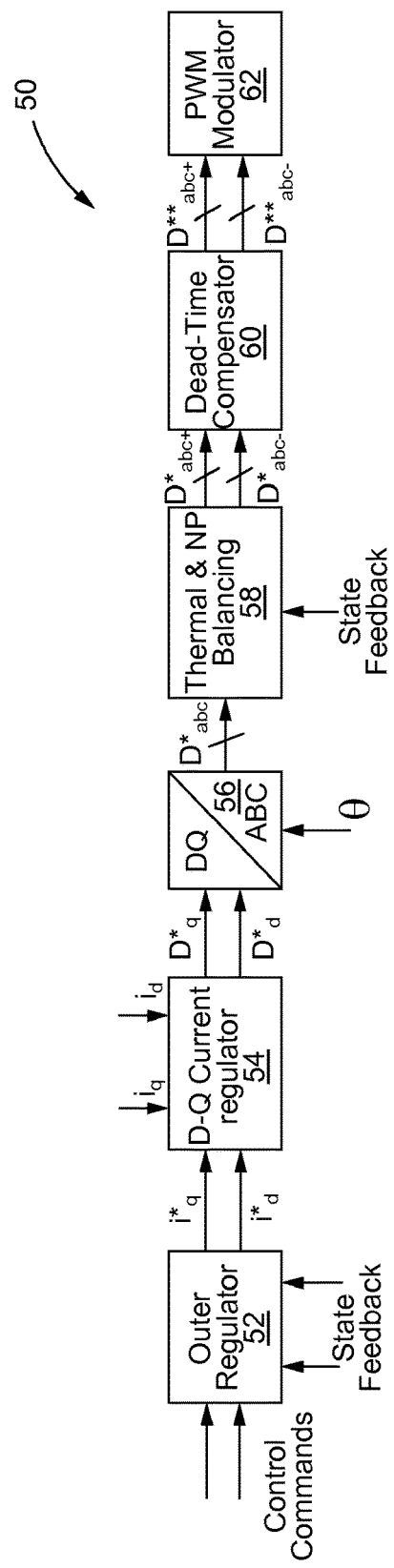
FIG. 6 is a schematic representation of a controller for the converter/inverter of FIGS. 2 and 4 according to an exemplary embodiment of the invention.

As shown best in FIG. 6, the controller 50 may include modules 52, 54, 56, 58, 60, 62 in communication with each other. More specifically, an outer regulator 52 may receive control command signals and state feedback signals to generate direct quadrature (D-Q) current command signals $i^*_q$, $i^*_d$. The control command signals may be real and reactive power, direct current (DC) link voltage, and the like. The state feedback signals may be real and reactive power, DC link voltage, and the like.

A D-Q current regulator 54 may receive the D-Q current command signals $i^*_q$, $i^*_d$ from the outer regulator 52, as well as measured D-Q current signals $i_q$, $i_d$, to generate D-Q duty cycle command signals $D^*_q$, $D^*_d$. A DQ/ABC transformation module 56 receives the D-Q duty cycle command signals $D^*_q$, $D^*_d$ and phase angle θ. The DQ/ABC transformation module 56 converts the two-phase D-Q duty cycle command signals $D^*_q$, $D^*_d$ into three-phase quantities, generating a three-phase duty cycle signal $D^*_{abc}$.

Figure 7:
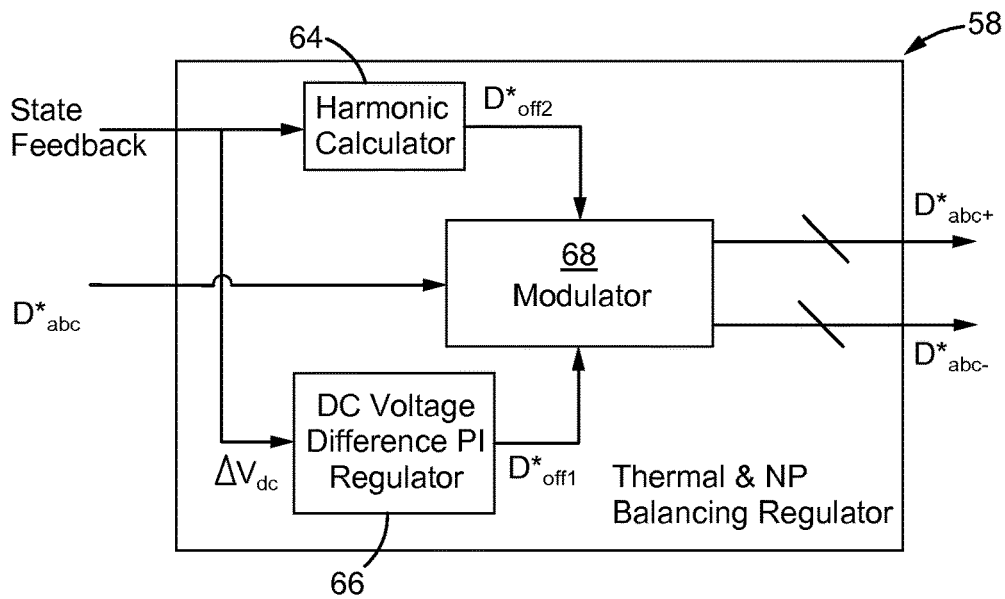
FIG. 7 is a schematic representation of a thermal and neutral point balancing regulator for the controller of FIG. 6 according to an exemplary embodiment of the invention.

The three-phase duty cycle signal $D^*_{abc}$ and state feedback signals are fed into a thermal and neutral point (NP) balancing module 58. The thermal and NP balancing module 58 generates duty cycle signals $D^*_{abc-}$, $D^*_{abc-}$ for upper and lower arms of each phase of the motor that balance neutral point voltage and thermal stress in the converter and/or inverter. More specifically, as shown best in FIG. 7, the thermal and NP balancing module 58 may include the following modules: harmonic calculator 64, DC voltage difference proportional-integral (PI) regulator 66, and modulator 68.

The harmonic calculator 64 receives the state feedback signals. Based on the state feedback signals, the harmonic calculator 64 generates a duty cycle injection signal $D^*_{off2}$ that balances NP voltage of the converter and/or inverter. In order to determine a value of duty cycle injection signal $D^*_{off2}$, the harmonic calculator 64 may be implemented using techniques such as, without limitation, a look-up table, linear equations, nonlinear equations, and the like.

A higher value for the duty cycle injection signal $D^*_{off2}$ indicates an increased injection applied to the converter and/or inverter. Therefore, increased current flows through outer insulated-gate bipolar transistors (IGBTs) and diodes, while less current flows through the neutral point path. When output current is high and frequency is low, a higher value of $D^*_{off2}$ can be chosen. When the converter/inverter has a decreased load, then a lower value of $D^*_{off2}$ may be appropriate for switching loss reduction. In so doing, the harmonic calculator 64 minimizes NP current in order to maintain a desired NP voltage of the converter/inverter.

The state feedback signals may include a voltage difference between upper and lower DC buses of the converter and inverter. The voltage difference between the upper and lower DC buses is fed into the DC voltage difference PI regulator 66. The DC voltage difference PI regulator 66 generates duty cycle injection signal $D^*_{off1}$ that eliminates steady-state NP voltage unbalance and has slow dynamics in order to prevent instability. In so doing, the DC voltage difference PI regulator 66 generates duty cycle injection signal $D^*_{off1}$ that balances or relieves uneven thermal stress across the plurality of devices in the converter/inverter.

Together with the three-phase duty cycle signal $D^*_{abc}$, the duty cycle injection signals $D^*_{off1}$ and $D^*_{off2}$ from modules 64, 66 are fed into the modulator 68. The modulator 68 determines the duty cycles for the upper and lower arms of each phase of the motor, generating duty cycle signals $D^*_{abc+}$, $D^*_{abc-}$. In order to calculate the duty cycles for upper and lower arms of each phase leg, the modulator 68 may use the following formula:

$$D^*_i = D^*_{abc} + 0.5[\max(D^*_{abc}) + \min(D^*_{abc})]$$
$$D^*_{abc+} = 0.5(D^*_i - \min(D^*_i)) + D^*_{off1} + D^*_{off2} \quad \text{for upper arm}$$
$$D^*_{abc-} = |0.5(D^*_i - \max(D^*_i))| - D^*_{off1} + D^*_{off2} \quad \text{for lower arm}$$

where $D^*_i$ is a duty cycle reference signal, $D^*_{abc}$ is the three-phase duty cycle signal, $D^*_{abc+}$ is the duty cycle signal for the upper arm, $D^*_{abc-}$ is the duty cycle signal for the lower arm, $D^*_{off1}$ is the duty cycle injection signal from the DC voltage difference PI regulator, and $D^*_{off2}$ is the duty cycle injection signal from the harmonic calculator.

It is to be understood that the neutral point balancing algorithm from the DC voltage difference PI regulator 66 with output $D^*_{off1}$ and the thermal balancing algorithm from the harmonic calculator 64 with output $D^*_{off2}$ may be used independently with a variety of base pulse width modulation (PWM) techniques. For example, in another embodiment, the above equations may be modified, and the modulator 68 may use the following formula in order to calculate the duty cycles for upper and lower arms of each phase leg:

$$D^*_i = D^*_{abc} + 0.5[\max(D^*_{abc}) + \min(D^*_{abc})]$$
$$D^*_{abc+} = D^*_{i+} + D^*_{off1} + D^*_{off2} \quad \text{for upper arm}$$
$$D^*_{abc-} = D^*_{i-} - D^*_{off1} + D^*_{off2} \quad \text{for lower arm}$$

where $D^*_i$ is the duty cycle reference signal, $D^*_{abc}$ is the three-phase duty cycle signal, $D^*_{abc+}$ is the duty cycle signal for the upper arm, $D^*_{abc-}$ is the duty cycle signal for the lower arm, $D^*_{off1}$ is the duty cycle injection signal from the DC voltage difference PI regulator, $D^*_{off2}$ is the duty cycle injection signal from the harmonic calculator, $D^*_{i+}$ is the positive side of the duty cycle corresponding to the i (=a, b, or c) phase, and $D^*_{i-}$ is the negative side of the duty cycle corresponding to the i (=a, b, or c) phase.

Other base PWM techniques that may be used include, but are not limited to, space vector PWM (SPWM), sin-triangle PWM with third harmonic injection, discontinuous PWM (DPWM) in which the switches are not switched during a period of large current in the alternating current waveform (e.g., converter/inverter), and the like.

Referring back to FIG. 6, a dead-time compensator 60 may receive the duty cycle signals $D^*_{abc+}$, $D^*_{abc-}$ from the thermal and neutral point (NP) balancing module 58. The dead-time compensator 60 may modify the duty cycle signals $D^*_{abc+}$, $D^*_{abc-}$ to compensate for dead-time, generating modified duty cycle signals $D^{}_{abc+}$, $D^{}_{abc-}$. Dead-time may be adopted to prevent shoot-through across the DC-link, as well as to guarantee a low voltage rate of change (dV/dt) stress at the alternating current (AC) terminals. Furthermore, application of proper dead-time compensation may prevent current distortion introduced by adopting dead-time. Dead-time compensation may be based on phase current direction, dead-time duration, and PWM frequency. The dead-time compensator 60 may determine dead-time compensation for each phase leg using the following formula:

$$\Delta D^*_{comp} = -\text{sign}(i) \times T_{DT} \times F_s$$
$$D^{**}_{abc+} = D^*_{abc+} + \Delta D^*_{comp} \quad \text{for upper arm}$$
$$D^{**}_{abc-} = D^*_{abc-} - \Delta D^*_{comp} \quad \text{for lower arm}$$

where $\Delta D^*_{comp}$ is the dead-time compensation, i is the phase current direction, $T_{DT}$ is the dead-time duration, $F_s$ is the PWM frequency, $D^*_{abc+}$ is the duty cycle signal for the upper arm, $D^*_{abc-}$ is the duty cycle signal for the lower arm, $D^{}_{abc+}$ is the modified duty signal for the upper arm, and $D^{}_{abc-}$ is the modified duty signal for the lower arm.

Figure 8:
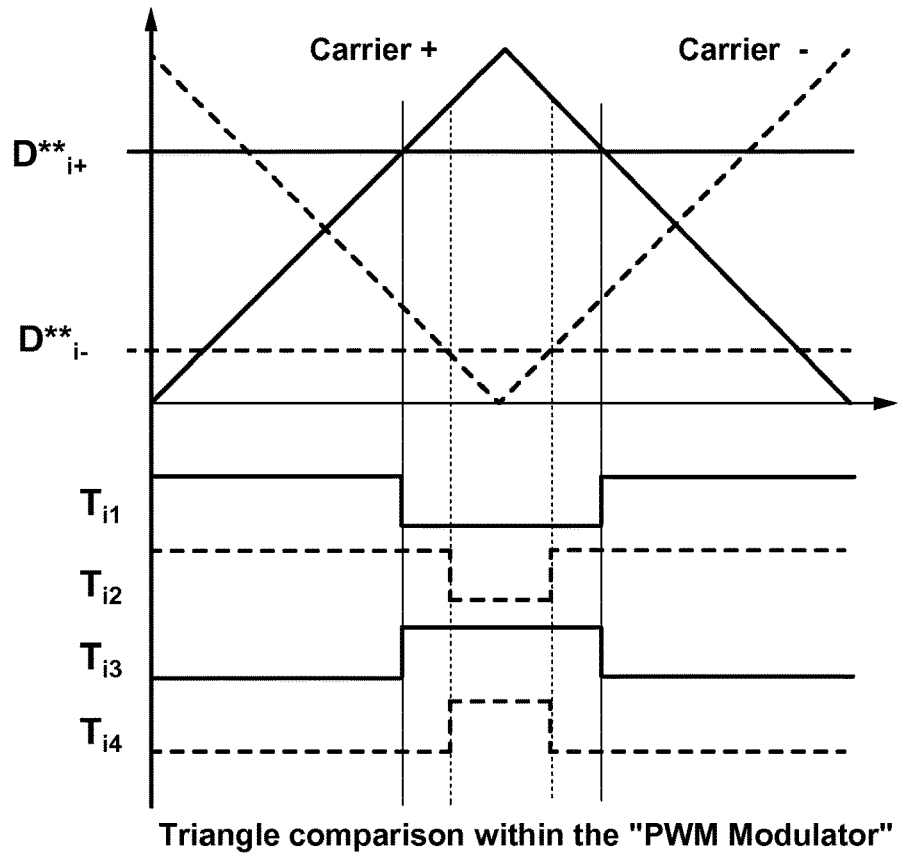
FIG. 8 is a diagram of a triangle comparison within a PWM modulator for the controller of FIG. 6 according to an exemplary embodiment of the invention.

A PWM modulator 62 may receive the modified duty signals $D^{}_{abc+}$, $D^{}_{abc-}$ for triangle comparison. Triangle comparison controls semiconductor devices in the power circuit and may be implemented in the PWM modulator 62, as illustrated in FIG. 8. There may be one comparator for each phase leg in the PWM modulator 62 that receives the modified positive and negative duty cycle signals $D^{}_{i+}$, $D^{}_{i-}$ for (i=a, b, c). The comparator may then output logic signals $T_{i1} \sim T_{i4}$ which control corresponding IGBTs (FIGS. 2-5) in the converter/inverter (where 1=turn on and 0=turn off). The modified positive and negative duty cycle signals $D^{}_{i+}$, $D^{}_{i-}$ from the modulators are compared with two carriers Carrier+, Carrier−, respectively. The two carriers Carrier+, Carrier− are phase-shifted by one hundred eighty degrees)(180°). The logic calculations are shown below:

If $D^*_{i+} \geq$ Carrier+, then $T_{i1}=1$, $T_{i3}=0$; else $T_{i1}=0$, $T_{i3}=1$ If $D^*_{i-} \geq$ Carrier−, then $T_{i4}=1$, $T_{i2}=0$; else $T_{i4}=0$, $T_{i2}=1$ where $D^*_{i-}$ is the negative side of the duty cycle corresponding to the i (=a, b, or c) phase, $D^*_{i-}$ is the positive side of the duty cycle corresponding to the i (=a, b, or c) phase, Carrier+ is the positive side of the carrier, Carrier− is the negative side of the carrier, and $T_{i1} \sim T_{i4}$ are the output logic signals controlling corresponding IGBTs in FIGS. 2-5.

Figure 9:
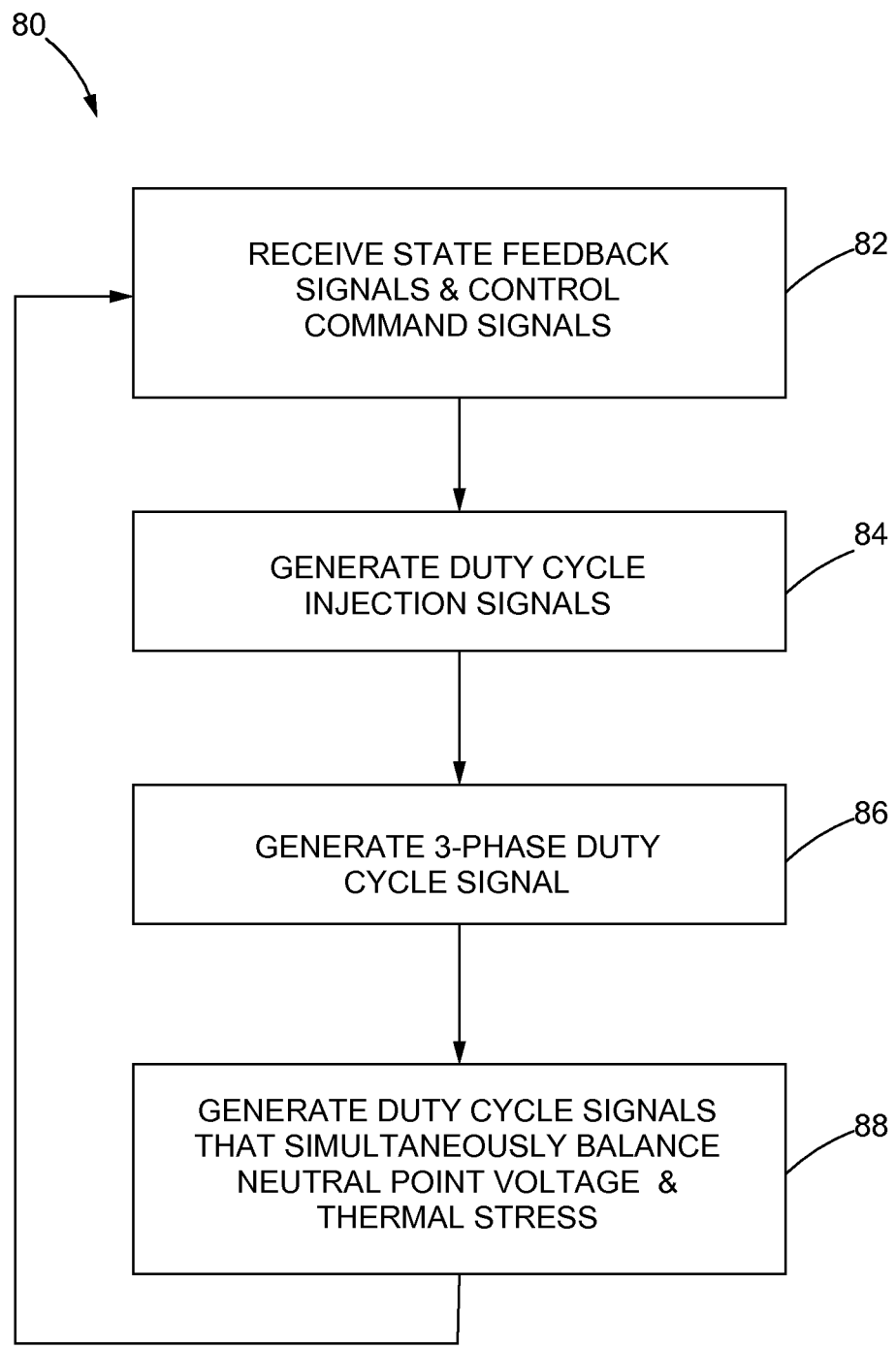
FIG. 9 is a flowchart illustrating an exemplary process for controlling a converter or an inverter, according to an exemplary embodiment of the invention.

Turning now to FIG. 9, with continued reference to FIGS. 1-8, an exemplary process 80 for controlling the converter 32 and/or inverter 34 coupled to the motor 28 is shown. At block 82, the controller 50 may receive state feedback signals and control command signals. The controller 50 may generate duty cycle injection signals $D^*_{off1}$, $D^*_{off2}$ based at least in part on the state feedback signals, at block 84. At block 86, the controller 50 may generate the three-phase duty cycle signal $D^*_{abc}$ based at least in part on the control command signals. At block 88, the controller 50 may generate duty cycle signals $D^*_{abc+}$, $D^*_{abc-}$ for upper and lower arms of each phase of the motor 28. The duty cycle signals $D^*_{abc+}$, $D^*_{abc-}$ may be based at least in part on the duty cycle injection signals $D^*_{off1}$, $D^*_{off2}$ and the three-phase duty cycle signal $D^*_{abc}$. Furthermore, the duty cycle signals $D^*_{abc+}$, $D^*_{abc-}$ balance neutral point voltage and thermal stress in the converter/inverter.

INDUSTRIAL APPLICABILITY

From the foregoing, it can be seen that the teachings of this disclosure can find industrial or commercial applications, such as, including but not limited to, control systems for regenerative drives. Such control systems may be used, for example, in traction applications, such as, including but not limited to, elevator systems.

The described disclosure provides a control system and method for a three-level converter and/or inverter in a regenerative drive. The disclosed modulation formulae for the control system and method are convenient for implementation in digital controllers. Using the disclosed modulation formulae appropriately, it is possible to control the neutral point current in order to balance the neutral point voltage, thereby minimizing the DC-link capacitance requirement. At the same time, the thermal stress in the converter/inverter can be distributed evenly among all the devices, which translates into a significant increase in the converter/inverter power throughput and a substantial enhancement in the expected device lifetime.

The disclosed controller conveniently manages thermal stress of the devices because the disclosed modulation techniques are related to only one control variable (duty cycle injection signal $D^*_{off2}$) and the control logic is straightforward. Furthermore, the disclosed thermal balancing modulation technique allows for continuous variation of the control variable (duty cycle injection signal $D^*_{off2}$), thereby eliminating the need to switch back and forth between the neutral point balancing PWM and bipolar PWM and improving voltage total harmonic distortion.

Figure 10:
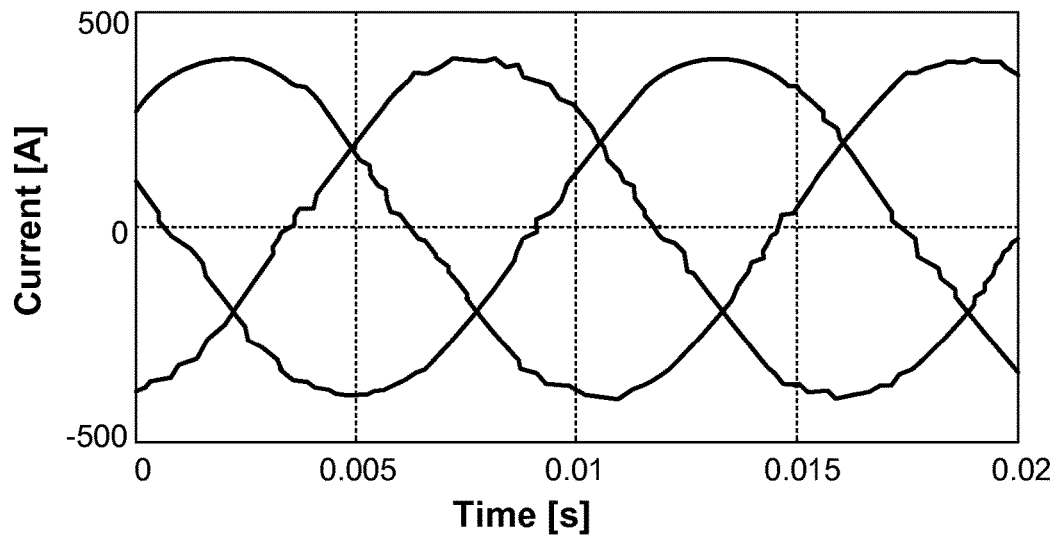
FIG. 10 is a graph of a current waveform of the prior art illustrating current distortion due to dead-time effects.
Figure 11:
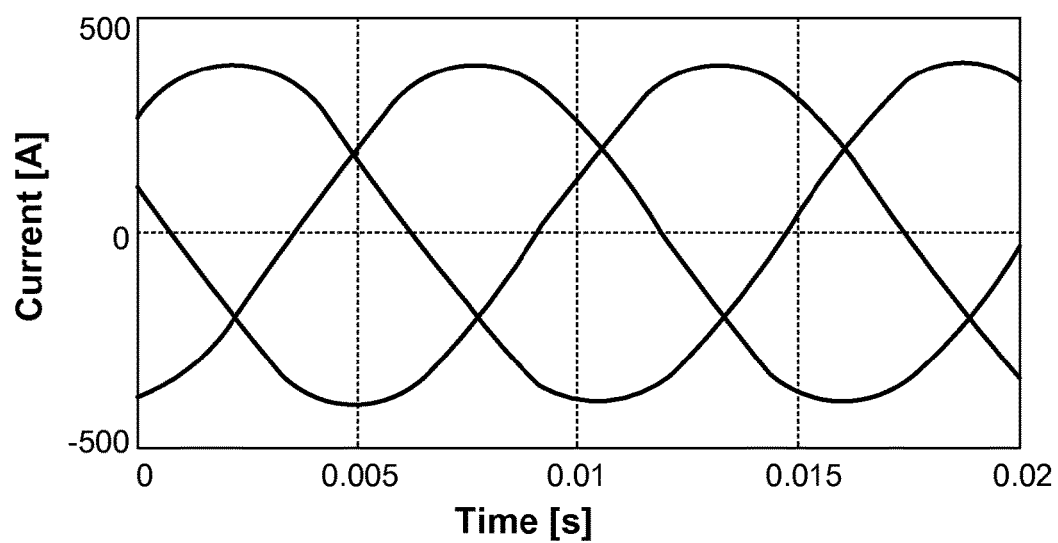
FIG. 11 is a graph of a current waveform with dead-time compensation using modulation techniques of the present disclosure according to an exemplary embodiment of the invention.
Figure 12:
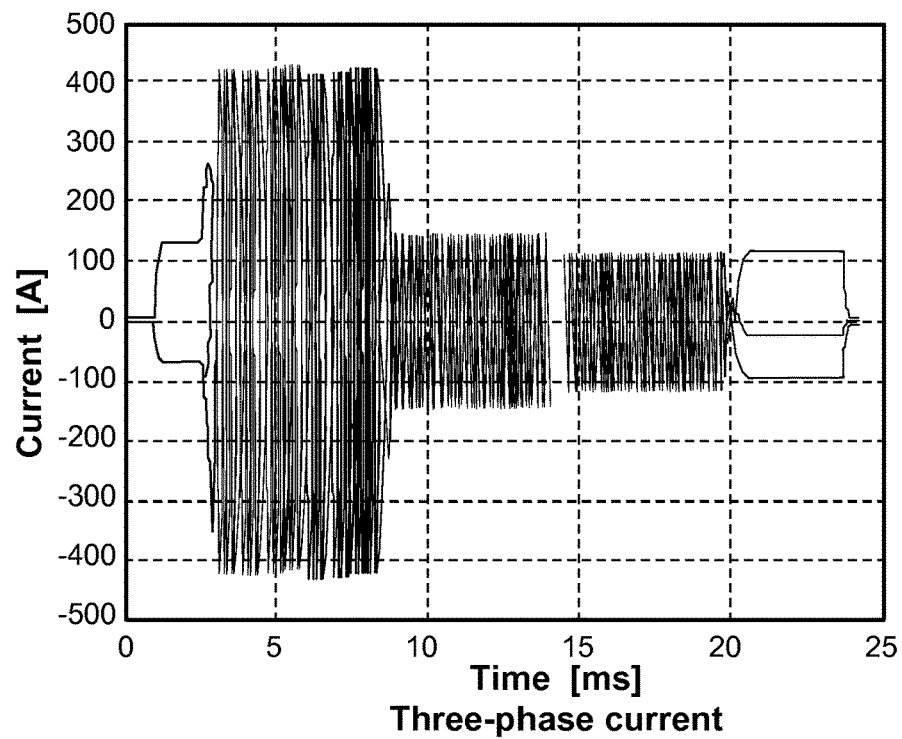
FIG. 12 is a graph showing simulation results of three-phase current of the prior art.
Figure 13:
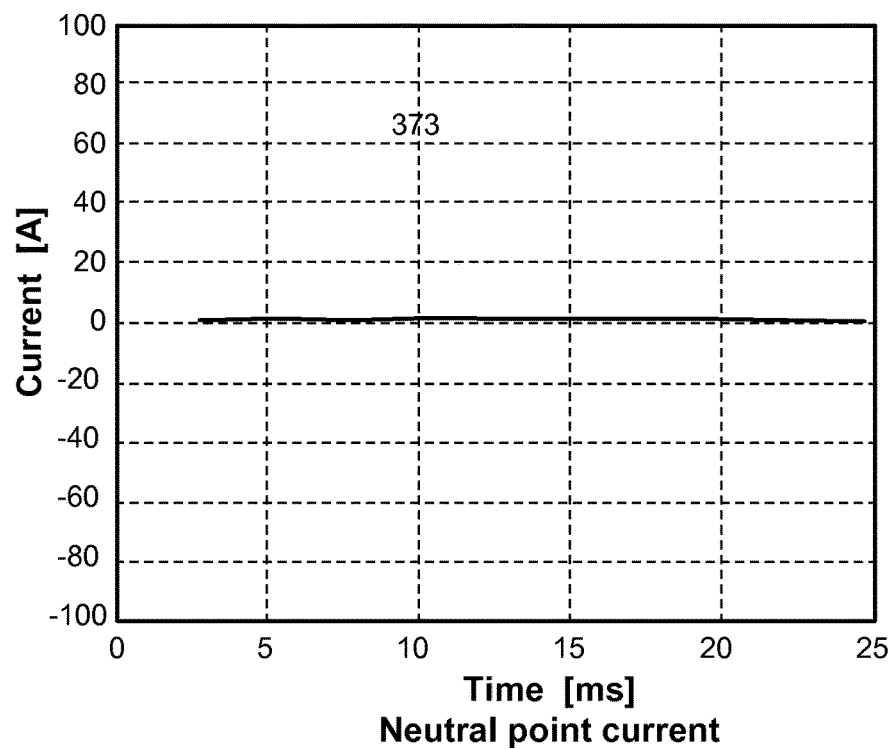
FIG. 13 is a graph showing simulation results of neutral point current using modulation techniques according to exemplary embodiments of the invention.
Figure 14:
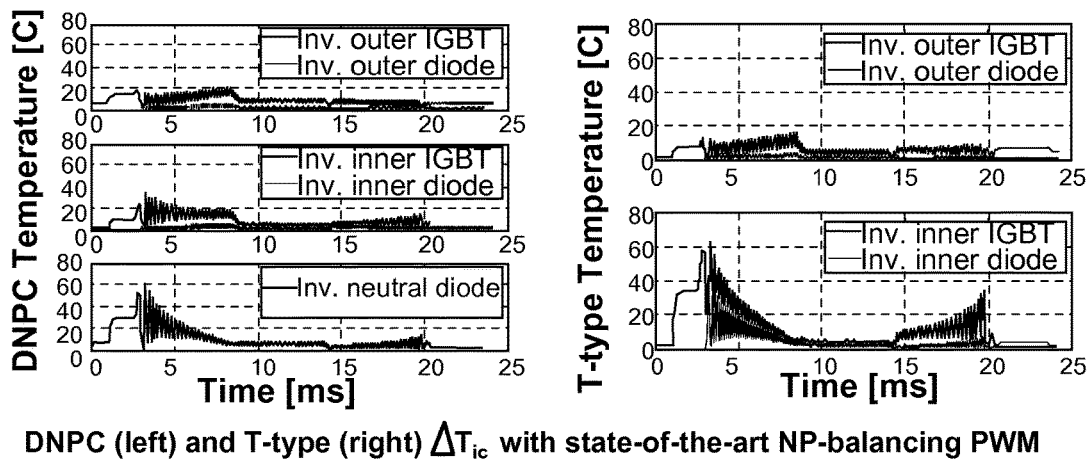
FIG. 14 is a graph showing simulation results for a maximum device j-c temperature rise $\Delta T_{jc}$ in both DNPC and T-type topologies of the prior art.

Moreover, the disclosed modulation techniques include dead-time compensation. Compared to the prior art current waveform shown in FIG. 10, the dead-time compensation of the present disclosure improves the current distortion due to dead-time effects, as shown in FIG. 11.

The modulation techniques disclosed herein can be used in both DNPC and T-type topologies for three-level converters and/or three-level inverters. FIGS. 12-15 depict simulation results of the disclosed modulation techniques compared to the prior art. Compared to the prior art results in FIG. 12, neutral point current is significantly minimized using the disclosed modulation techniques, as shown in FIG.

Figure 15:
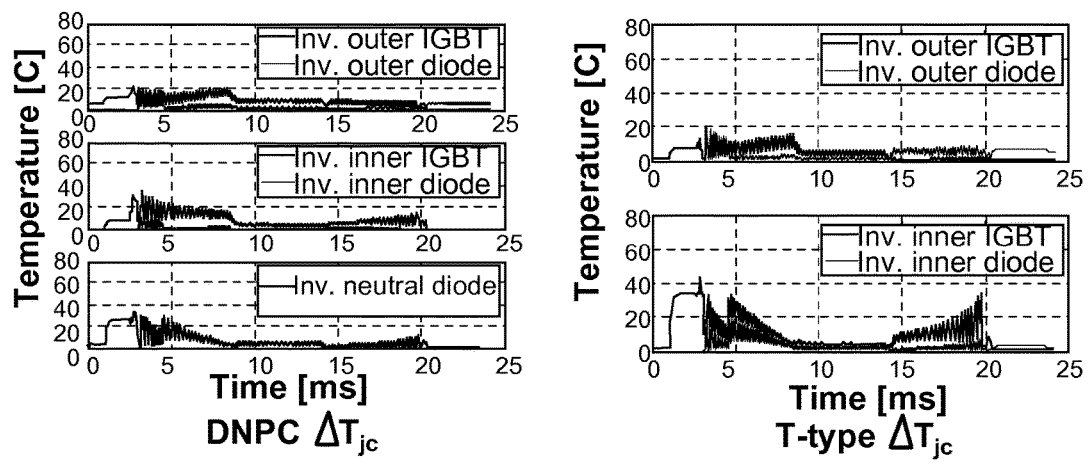
FIG. 15 is a graph showing simulation results for a maximum device j-c temperature rise $\Delta T_{jc}$ in both DNPC and T-type topologies using modulation techniques according to various exemplary embodiments of the invention.

13. Compared to the prior art results in FIG. 14, the maximum device j-c temperature rise $\Delta T_{jc}$ is also significantly reduced using the disclosed modulation techniques, as shown in FIG. 15. In addition, the benefits of the disclosed techniques are achieved without using higher rating devices or adding extra circuit components, and the increased computational power required to fulfill the described techniques is minimal.

While the foregoing detailed description has been given and provided with respect to certain specific embodiments, it is to be understood that the scope of the disclosure should not be limited to such embodiments, and that the same are provided simply for enablement and best mode purposes. The breadth and spirit of the present disclosure is broader than the embodiments specifically disclosed and encompassed within the claims appended hereto. It is understood that features described with relation to a specific embodiment may be used with alternate embodiments where practicable.

What is claimed is:

1. A control system having a motor, comprising:
a converter operatively connected to a power source, the converter having a plurality of devices in selective communication with each phase of the power source;
an inverter operatively connected to the motor, the inverter having a plurality of devices in selective communication with each phase of the motor; and
a controller operatively connected to the converter or inverter, the controller being configured to:
receive control command signals;
receive state feedback signals; and
generate duty cycle signals for upper and lower arms of each phase of the motor based at least in part on the control command signals and state feedback signals, the duty cycle signals minimizing neutral point current in the converter or inverter;
wherein the controller is further configured to generate duty cycle injection signals based at least in part on the state feedback signals, a first duty cycle injection signal configured to balance neutral point voltage in the converter or inverter and a second duty cycle injection signal configured to relieve thermal stress across the plurality of devices.

2. The control system of claim 1, wherein the controller is further configured to generate a three-phase duty cycle signal based at least in part on the control command signals.

3. The control system of claim 2, wherein the controller is further configured to generate a duty cycle reference signal using the three-phase duty cycle signal.

4. The control system of claim 3, wherein the controller is further configured to determine the duty cycle signals for the upper and lower arms of each phase using the following formula:

$$D^*_i = D^*_{abc} + 0.5[\max(D^*_{abc}) + \min(D^*_{abc})]$$
$$D^*_{abc+} = 0.5(D^*_i - \min(D^*_i)) + D^*_{off1} + D^*_{off2} \quad \text{for upper arm}$$
$$D^*_{abc-} = |0.5(D^*_i - \max(D^*_i))| - D^*_{off1} + D^*_{off2} \quad \text{for lower arm}$$

where $D^*_i$ is the duty cycle reference signal, $D^*_{abc}$ is the three-phase duty cycle signal, $D^*_{abc+}$ is the duty cycle signal for the upper arm, $D^*_{abc-}$ is the duty cycle signal for the lower arm, and $D^*_{off1}$ and $D^*_{off2}$ are the duty cycle injection signals.

5. The control system of claim 3, wherein the controller is further configured to determine the duty cycle signals for the upper and lower arms of each phase using the following formula:

$$D^*_i = D^*_{abc} + 0.5[\max(D^*_{abc}) + \min(D^*_{abc})]$$
$$D^*_{abc+} = D^*_{i+} + D^*_{off1} + D^*_{off2} \quad \text{for upper arm}$$
$$D^*_{abc-} = D^*_{i-} - D^*_{off1} + D^*_{off2} \quad \text{for lower arm}$$

where $D^*_i$ is the duty cycle reference signal, $D^*_{abc}$ is the three-phase duty cycle signal, $D^*_{abc+}$ is the duty cycle signal for the upper arm, $D^*_{abc-}$ is the duty cycle signal for the lower arm, $D^*_{off1}$ is the duty cycle injection signal from the DC voltage difference PI regulator, $D^*_{off2}$ is the duty cycle injection signal from the harmonic calculator, $D^*_{i+}$ is the positive side of the duty cycle corresponding to the i (=a, b, or c) phase, and $D^*_{i-}$ is the negative side of the duty cycle corresponding to the i (=a, b, or c) phase.

6. A control system having a motor, comprising:
a converter operatively connected to a power source, the converter having a plurality of devices in selective communication with each phase of the power source;
an inverter operatively connected to the motor, the inverter having a plurality of devices in selective communication with each phase of the motor; and
a controller operatively connected to the converter or inverter, the controller being configured to:
receive control command signals;
receive state feedback signals; and
generate duty cycle signals for upper and lower arms of each phase of the motor based at least in part on the control command signals and state feedback signals, the duty cycle signals minimizing neutral point current in the converter or inverter;
wherein the controller is further configured to determine dead-time compensation for each phase using the following formula:

$$\Delta D^*_{comp} = \text{sign}(i) \times T_{DT} \times F_s$$

where $\Delta D^*_{comp}$ is the dead-time compensation, i is phase current direction, $T_{DT}$ is dead-time duration, and $F_s$ is pulse width modulation frequency.

7. The control system of claim 1, wherein the converter or inverter has a diode-neutral-point-clamped topology or a T-type topology.

8. The control system of claim 1, wherein the control system is applied to an elevator system.

9. A method for controlling a converter or an inverter, the method comprising:
receiving state feedback signals and control command signals;
generating duty cycle injection signals based at least in part on the state feedback signals;
generating a three-phase duty cycle signal based at least in part on the control command signals;
generating duty cycle signals for upper and lower arms of each phase of the motor which simultaneously balance neutral point voltage and thermal stress in the converter or inverter, the duty cycle signals being based at least in part on the duty cycle injection signals and the three-phase duty cycle signal;
determining dead-time compensation for each phase based at least in part on phase current direction, dead-time duration, and pulse width modulation frequency.

10. The method of claim 9, further comprising modifying the duty cycle signals to incorporate the dead-time compensation.

11. The method of claim 9, further comprising the converter or inverter having a diode-neutral-point-clamped topology or a T-type topology.

12. The method of claim 9, further comprising determining values of the duty cycle injection signals based at least in part on the state feedback signals and a voltage difference between upper and lower DC buses of the converter or inverter.

13. An elevator system, comprising:
an elevator car disposed in a hoistway;
a motor operatively connected to the elevator car, the motor generating a thrust force to move the elevator car within the hoistway;
a power source operatively connected to the motor, the power source supplying power to the motor;
a converter operatively connected to the power source, the converter having a plurality of devices in selective communication with each phase of the power source;
an inverter operatively connected to the motor, the inverter having a plurality of devices in selective communication with each phase of the motor; and
a controller in communication with the converter or inverter, the controller being configured to: receive control command signals;
receive state feedback signals; and
generate duty cycle signals for upper and lower arms of each phase of the motor that simultaneously balance neutral point voltage and thermal stress in the converter or inverter, the duty cycle signals being based at least in part on the control command signals and the state feedback signals;
wherein the controller is further configured to determine dead-time compensation for each phase of the motor, and modify the duty cycle signals to include the dead-time compensation.

14. The elevator system of claim 13, wherein the converter or inverter has a diode-neutral-point-clamped topology or a T-type topology.

15. The elevator system of claim 13, wherein the controller is further configured to have a harmonic calculator, the harmonic calculator generating a duty cycle injection signal that balances neutral point voltage of the converter or inverter.

16. The elevator system of claim 13, wherein the controller is further configured to have a voltage difference regulator, the voltage difference regulator generating a duty cycle injection signal that balances thermal stress across the plurality of devices in the converter or inverter.

* * * * *